United States Patent [19]

Ohlsson et al.

[11] Patent Number: 4,494,964
[45] Date of Patent: Jan. 22, 1985

[54] POROUS CERAMIC ABRASIVE WHEEL OR CERAMIC FILTER

[75] Inventors: Stig L. Ohlsson, Ljungbyhed; Jan-Olov K. Berthou, Hässleholm, both of Sweden

[73] Assignee: Perstorp AB, Perstorp, Sweden

[21] Appl. No.: 597,023

[22] Filed: Apr. 5, 1984

[51] Int. Cl.$^3$ .............................................. B24B 1/00
[52] U.S. Cl. ............................................................ 51/296
[58] Field of Search ..................................... 51/296, 298

[56] References Cited

U.S. PATENT DOCUMENTS 4,086,067 4/1978 Busch et al. .......................... 51/296
4,350,497 9/1982 Ogman .................................. 51/296

Primary Examiner—Theodore Morris
Assistant Examiner—Willie Thompson
Attorney, Agent, or Firm—Stevens, Davis, Miller & Mosher

[57] ABSTRACT

Use of fine-grained pentaerythritol, dipentaerythritol or a mixture of these compounds as a pore forming additive in porous ceramic products such as ceramic abrasive wheels and ceramic filters.

1 Claim, No Drawings

POROUS CERAMIC ABRASIVE WHEEL OR CERAMIC FILTER

The present invention relates to the use of a fine-grained pore forming additive for the production of porous ceramic products such as ceramic abrasive wheels and ceramic filters.

Porous ceramic abrasive wheels have been known for a long time. Such products are for instance described in the U.S. Pat. Nos. 2,290,876 and 4,086,067. The pores of these abrasive wheels are desirable for several reasons. They give for example space for removal of released metal shavings. Furthermore, at grinding the pores counteract a too high temperature at the surface of the ground material.

At the production of such porous ceramic abrasive wheels the different components, such as abrasive grains, ceramic binder, wetting agent and fine-grained pore forming additive, are first mixed in many steps. Then the mixture obtained is pressed to so-called wheel work pieces. Thus, in these wheel work pieces there are particles of pore forming additive equally divided. These particles are burnt away at a later step of the production procedure, whereby the desired pores are obtained. Among the pore forming additives known so far in this connection, particles of dichlorobenzene, napthalene, walnut shells, cork, mustard seeds and of plastics materials such as polyethylene, polyester, polystyrene, polyamide and phenolformaldehyde resin can be mentioned.

These known pore forming agents have one or more disadvantages. Some of the agents such as naphthalene and dichlorobenzene give big problems of smell inside as well as outside the factory at the production of the abrasive wheels. Moreover, dichlorobenzene gives an undesired coating on the inner side of the ovens at the firing. The other pore forming agents influence the properties of the abrasive wheels in a negative way. Thus, in certain cases the abrasive wheels get a too low strength or irregularly divided pores.

According to the present invention it has quite surprisingly been found out that fine-grained pentaerythritol, dipentaerythritol or a mixture of these compounds can be used as a pore forming additive in porous ceramic products such as ceramic abrasive wheels and ceramic filters.

Accordingly the new additive does not cause any troublesome smell or other inconveniences at the production of the ceramic products. Moreover, the porous ceramic abrasive wheels produced become at least as good as those that it has been possible to produce so far at very unpleasant environmental conditions.

The verage particle size of the new additive is usually 30–3000 $\mu$m, preferably 300–1500 $\mu$m.

The invention will be explained more in detail in connection with the embodiment examples below, of which examples 1 and 2 relate to comparison tests with previously known pore forming agents and examples 3 and 4 show embodiments according to the invention.

EXAMPLE 1

580 g abrasive grains consisting of special fused alumina (aluminium oxide) was charged into a mixer provided with a stirrer. According to FEPA standard 25 percent by weight of the grains had the size 54, 50 percent by weight of the grains the size 60 and 25 percent by weight of the grains the size 70.

200 g wetting agent consisting of a 10 percent by weight dextrin solution in water was charged into the mixer at stirring.

140 g pulverulent ceramic binder consisting of 75 percent by weight of felspar, 23 percent by weight of kaolin and 2 percent by weight of borax and 80 g of a known pore forming additive consisting of pulverulent dichlorobenzene with an average particle size of 800 $\mu$m were premixed and then charged into the mixer at stirring. The mixing with the other components in the mixer was carried out carefully until a homogeneous abrasive composition had been obtained.

The dichlorobenzene of the produced abrasive composition had a short stability in storage. Therefore, the abrasive composition had to be used quickly. This is of course a drawback. Furthermore, dichlorobenzene has a troublesome smell. Therefore, it is unsatisfactory from health and environmental viewpoint.

The abrasive composition was sieved for removal of any possible lumps.

Thereafter, a wheel work piece was pressed of the abrasive composition in the usual way. The wheel work piece was predried for about 24 hours at a temperature up to 60° C. and at a supply of steam to avoid crack formation and surface drying.

Then the wheel work piece was fired for 20 hours at a successive increase of the temperature up to a maximum temperature of about 1200° C. The maximum temperature was kept for 6 hours. The subsequent chilling of the produced abrasive wheel lasted for about 72 hours, whereupon the abrasive wheel was finally aftertreated to a finished product.

At the above firing the dichlorobenzene caused an undesirable coating in the ovens. Moreover, at some or more steps of the production procedure, the dichlorobenzene released halogens, which are corrosive and dangerous for the surrounding environment.

EXAMPLE 2

598 g abrasive grains consisting of special fused alumina (aluminium oxide) was charged into a mixer provided with a stirrer.

According to FEPA standard 25 percent by weight of the grains had the size 54, 50 percent by weight of the grains the size 60 and 25 percent by weight of the grains the size 70.

200 g wetting agent consisting of a 10 percent by weight dextrin solution in water was charged into the mixer at stirring.

142 g pulverulent ceramic binder consisting of 75 percent by weight of felspar, 23 percent by weight of kaolin and 2 percent by weight of borax and 60 g of a known pore forming additive consisting of pulverulent naphthalene with an average particle size of 800 $\mu$m were premixed and then charged into the mixer at stirring. The mixing with the other components in the mixer was carried out carefully until a homogeneous abrasive composition had been obtained.

The abrasive composition was sieved for removal of any possible lumps.

Thereafter, a wheel work piece was pressed of the abrasive composition in the usual way. The wheel piece was predried for about 24 hours at a temperature up to 90° C. and at a supply of steam to avoid crack formation and surface drying.

Then the wheel work piece was fired for 20 hours at a successive increase of the temperature up to a maximum temperature of about 1200° C. The maximum temperature was kept for 6 hours. The subsequent chilling of the produced abrasive wheel lasted for about 72 hours, whereupon the abrasive wheel was finally aftertreated to a finished product.

At the above production the naphthalene caused an extremely troublesome smell. Therefore, special protective regulations had to be used.

EXAMPLE 3

607 g abrasive grains consisting of special fused alumina (aluminium oxide) was charged into a mixer provided with a stirrer. According to FEPA standard 25 percent by weight of the grains had the size 54, 50 percent by weight of the grains the size 60 and 25 percent by weight of the grains the size 70.

200 g wetting agent consisting of a 10 percent by weight dextrin solution in water was charged into the mixer at stirring.

143 g pulverulent ceramic binder consisting of 75 percent by weight of felspar, 23 percent by weight of kaolin and 2 percent by weight of borax and 50 g pore forming additive consisting of pulverulent pentaerythritol with an average particle size of 800 μm were premixed and then charged into the mixer at stirring. The mixing with the other components in the mixer was carried out carefully until a homogeneous abrasive composition had been obtained.

The abrasive composition was sieved for removal of any possible lumps.

Thereafter, a wheel work piece was pressed of the abrasive composition in the usual way. The wheel work piece was predried for about 24 hours at a temperature up to 120° C. and at a supply of steam to avoid crack formation and surface drying.

Then the wheel work piece was fired for 20 hours at a successive increase of the temperature up to a maximum temperature of about 1200° C. The maximum temperature was kept for 6 hours. The subsequent chilling of the produced abrasive wheel lasted for about 72 hours, whereupon the abrasive wheel was finally aftertreated to a finished product.

The pentaerythritol used gave no problems of smell or other problems at the production of the abrasive wheel.

In comparison with the abrasive wheels produced according to examples 1 and 2 the produced abrasive wheel had equivalent qualities concerning porosity, air permeability, strength, mechanical penetration resistance and grinding qualities.

EXAMPLE 4

607 g abrasive grains consisting of special fused alumina (aluminium oxide) was charged into a mixer provided with a stirrer. According to FEPA standard 25 percent by weight of the grains had the size 54, 50 percent by weight of the grains the size 60 and 25 percent by weight of the grains the size 70.

200 g wetting agent consisting of a 10 percent by weight dextrin solution in water was charged into the mixer at stirring.

143 g pulverulent ceramic binder consisting of 75 percent by weight of felspar, 23 percent by weight of kaolin and 2 percent by weight of borax and 50 g of pore forming additive consisting of a pulverulent mixture of 90 percent by weight of monopentaerythritol and 10 percent by weight of dipentaerythritol with an average particle size of 800 μm were premixed and then charged into the mixer at stirring. The mixing with the other components in the mixer was carried out carefully until a homogeneous abrasive composition had been obtained.

The abrasive composition was sieved for removal of any possible lumps.

Thereafter, a wheel work piece was pressed of the abrasive composition in the usual way. The wheel work piece was predried for about 24 hours at a temperature up to 120° C. and at a supply of steam to avoid crack formation and surface drying.

Then the wheel work piece was fired for 20 hours at a successive increase of the temperature up to a maximum temperature of about 1200° C. The maximum temperature was kept for 6 hours. The subsequent chilling of the produced abrasive wheel lasted for about 72 hours, whereupon the abrasive wheel was finally aftertreated to a finished product.

The pore forming additive used consisting of a mixture of monopentaerythritol and dipentaerythritol gave no problems of smell or other problems at the production of the abrasive wheel.

In comparison with the abrasive wheels produced according to examples 1 and 2 the produced abrasive wheel had equivalent qualities concerning porosity, air permeability, strength, mechanical penetration resistance and grinding qualities.

As mentioned above, besides at the production of porous ceramic abrasive wheels, the pore forming additive can according to the invention also be used at the production of other porous ceramic products, such as ceramic filters. Such filters can for example be used for filtration of air, water and organic substances. The advantage of ceramic filters is for instance that they can be used at high temperatures and that they are not combustible.

The invention is not limited to the embodiments shown, since these can be modified in different ways within the scope of the invention.

We claim:

1. A porous ceramic abrasive wheel or ceramic filter comprising pores formed therein from fine-grained pentaerythritol, dipentaerythritol, or a mixture thereof, as a pore forming additive.

* * * * *

UNITED STATES PATENT AND TRADEMARK OFFICE
CERTIFICATE OF CORRECTION

PATENT NO. : 4,494,964
DATED : January 22, 1985
INVENTOR(S) : OHLSSON et al.

It is certified that error appears in the above-identified patent and that said Letters Patent is hereby corrected as shown below:

On the cover page, after the [22] line giving the U. S. filing date, insert:

--[30] Foreign Application Priority Data

April 18, 1983 [Sw] Sweden ......83 02147-7--.

Column 1, line 54, for "verage" read -- average --.

Signed and Sealed this

Eleventh Day of June 1985

[SEAL]

*Attest:*

DONALD J. QUIGG

*Attesting Officer*     *Acting Commissioner of Patents and Trademarks*